(12) United States Patent
Anno et al.

(10) Patent No.: US 10,788,801 B2
(45) Date of Patent: Sep. 29, 2020

(54) BIG DRILLING DATA ANALYTICS ENGINE

(71) Applicant: CONOCOPHILLIPS COMPANY, Houston, TX (US)

(72) Inventors: Phil D. Anno, Eureka Springs, AR (US); Son Pham, The Woodlands, TX (US); Stacey C. Ramsay, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 16/418,345

(22) Filed: May 21, 2019

(65) Prior Publication Data
US 2019/0278240 A1    Sep. 12, 2019

Related U.S. Application Data

(63) Continuation of application No. 15/152,808, filed on May 12, 2016, now Pat. No. 10,345,771.

(60) Provisional application No. 62/160,998, filed on May 13, 2015.

(51) Int. Cl.
*G05B 15/02* (2006.01)
*E21B 44/04* (2006.01)

(52) U.S. Cl.
CPC .............. *G05B 15/02* (2013.01); *E21B 44/04* (2013.01)

(58) Field of Classification Search
CPC .............................. E21B 44/04; G05B 15/02
See application file for complete search history.

(56) References Cited

U.S. PATENT DOCUMENTS

| | | | | |
|---|---|---|---|---|
| 6,021,377 A | * | 2/2000 | Dubinsky | E21B 7/068 702/9 |
| 6,208,586 B1 | * | 3/2001 | Rorden | E21B 47/101 181/105 |
| 8,805,616 B2 | * | 8/2014 | Hinkel | G01N 33/24 702/11 |
| 9,046,509 B2 | * | 6/2015 | Dvorkin | G01N 33/24 |
| 10,345,771 B2 | * | 7/2019 | Anno | G05B 15/02 |
| 2012/0277996 A1 | * | 11/2012 | Hurley | G01V 99/005 702/11 |

* cited by examiner

*Primary Examiner* — Elias Desta

(57) ABSTRACT

The invention relates to systems, processes and apparatuses for determining a rig-state of a drilling rig during a wellbore drilling operation and detecting and mitigating drilling dysfunctions. These systems, processes and apparatuses provide a computer with a memory and a processor, a plurality of sensors associated with a wellbore drilling operation for acquiring time series data wherein the data are formatted for sample and bandwidth regularization and time-corrected to provide substantially time-synchronized data, a processing graph of data-stream networked mathematical operators that applies continuous analytics to the data at least as rapidly as the data are acquired to determine dynamic conditions of a plurality of rig conditions associated with the wellbore drilling operation and determining a rig-state from the plurality of rig conditions.

20 Claims, 16 Drawing Sheets

BIG DRILLING DATA ANALYTICS ENGINE

CROSS-REFERENCE TO RELATED APPLICATIONS

This application is a continuation application which claims benefit under 35 USC § 120 to U.S. application Ser. No. 15/152,808 filed May 12, 2016, now U.S. Pat. No. 10,345,771, which claims benefit under 35 USC § 119(e) to U.S. Provisional Application Ser. No. 62/160,998 filed May 13, 2015, entitled "BIG DRILLING DATA ANALYTICS ENGINE," which is incorporated herein in its entirety.

STATEMENT REGARDING FEDERALLY SPONSORED RESEARCH

None.

FIELD OF THE INVENTION

The present invention relates generally to detection, quantification and mitigation of dysfunctions in drilling for hydrocarbons. More particularly, but not by way of limitation, embodiments of the present invention include applying analytics to real-time data acquired from wellbore drilling operations to mitigate drilling dysfunctions.

BACKGROUND OF THE INVENTION

Hydrocarbon reservoirs are developed with drilling operations using a drill bit associated with a drill string rotated from the surface or using a downhole motor, or both using a downhole motor and also rotating the string from the surface. A bottom hole assembly (BHA) at the end of the drill string may include components such as drill collars, stabilizers, drilling motors and logging tools, and measuring tools. A BHA is also capable of telemetering various drilling and geological parameters to the surface facilities.

Resistance encountered by the drill string in a wellbore during drilling causes significant wear on drill string, especially often the drill bit and the BHA. Understanding how the geometry of the wellbore affects resistance on the drill string and the BHA and managing the dynamic conditions that lead potentially to failure of downhole equipment is important for enhancing efficiency and minimizing costs for drilling wells. Various conditions referred to as drilling dysfunctions that may lead to component failure include excessive torque, shocks, bit bounce, induced vibrations, bit whirl, stick-slip, bit-bounce among others. These conditions must be rapidly detected so that mitigation efforts are undertaken as quickly as possible, since some dysfunctions can quickly lead to tool failures.

Rapid aggregation and analysis of data from multiple sources associated with well bore drilling operations facilitates efficient drilling operations by timely responses to drilling dysfunctions. Accurate timing information for borehole or drill string time-series data acquired with down hole sensors are important for aggregating information from surface and down hole sensors. However, each sensor may have its own internal clock or data from many sensors may be acquired and recorded relative to multiple clocks that are not synchronized. This non-synchronization of the timing information creates problems when combining and processing data from various sensors. Additionally, sensor timing is known sometimes to be affected by various environmental factors that cause variable timing drift that may differentially impact various sensors. Many factors may render inaccurate the timing of individual sensors that then needs to be corrected or adjusted so the data may be assimilated correctly with all sensor information temporally consistent in order to accurately inform a drilling operations center about the dynamic state of the well being drilled.

Downhole drilling dysfunctions can cause serious operational problems that are difficult to detect or predict. The more rapidly and efficiently drilling dysfunctions are identified the more quickly they may be mitigated. Thus a need exists for efficient methods, systems and apparatuses to quickly identify and to mitigate dysfunctions during drilling operations.

BRIEF SUMMARY OF THE DISCLOSURE

It should be understood that, although an illustrative implementation of one or more embodiments are provided below, the various specific embodiments may be implemented using any number of techniques known by persons of ordinary skill in the art. The disclosure should in no way be limited to the illustrative embodiments, drawings, and/or techniques illustrated below, including the exemplary designs and implementations illustrated and described herein. Furthermore, the disclosure may be modified within the scope of the appended claims along with their full scope of equivalents.

The invention more particularly includes in nonlimiting embodiments a system for determining a rig-state of a drilling rig during a wellbore drilling operation comprises a computer comprising a memory and a processor, a plurality of sensors associated with a wellbore drilling operation for acquiring time series data wherein the data are formatted for sample and bandwidth regularization and time-corrected to provide substantially time-synchronized data, a processing graph of data-stream networked mathematical operators that applies continuous analytics to the data at least as rapidly as the data are acquired to determine dynamic conditions of a plurality of rig conditions associated with the wellbore drilling operation and determining a rig-state from the plurality of rig conditions.

In another nonlimiting embodiment, a process for determining a rig-state of a drill rig comprises acquiring data from a plurality of sensors associated with a wellbore, formatting the acquired data for sample and bandwidth regularization, time-correcting the data to provide substantially isochronously sampled data from the plurality of sensors, processing the acquired data through a processing graph of networked mathematical operators that apply continuous analytics to the data at least as rapidly as the data are acquired to determine dynamic conditions of a plurality of rig operations associated with the wellbore and determining a rig-state from the plurality of rig operations conditions.

In still further nonlimiting embodiments a drilling rig apparatus for mitigating drilling dysfunctions comprises a drill rig associated with a plurality of sensors providing time series data to a surface-based aggregator wherein the data are formatted for sample and bandwidth regularization and time-corrected to provide substantially time-synchronized data, a computer comprising a memory and a processor, a processing graph of data-stream networked mathematical operators that applies continuous analytics at least as rapidly as the time-series are acquired to determine dynamic conditions of a plurality of rig conditions associated with wellbore drilling operation and detecting a drilling dysfunction from the plurality of rig conditions.

In yet more nonlimiting embodiments a computer program product is embodied in non-transitory computer readable media, the computer program product adapted to execute a process to mitigate a drilling dysfunction during a wellbore drilling operation, which comprises acquiring data from a plurality of sensors associated with a wellbore drilling operation, formatting the acquired data for sample and bandwidth regularization, time-correcting the data to provide substantially synchronously sampled data from the plurality of sensors, processing the acquired data through a processing graph of networked mathematical operators that apply continuous analytics to the data at least as rapidly as the data are acquired to determine dynamic conditions of a plurality of rig operations associated with the wellbore, detecting a drilling dysfunction from the plurality of rig operations conditions, and outputting drill rig control instructions to mitigate the detected drilling dysfunction.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1:
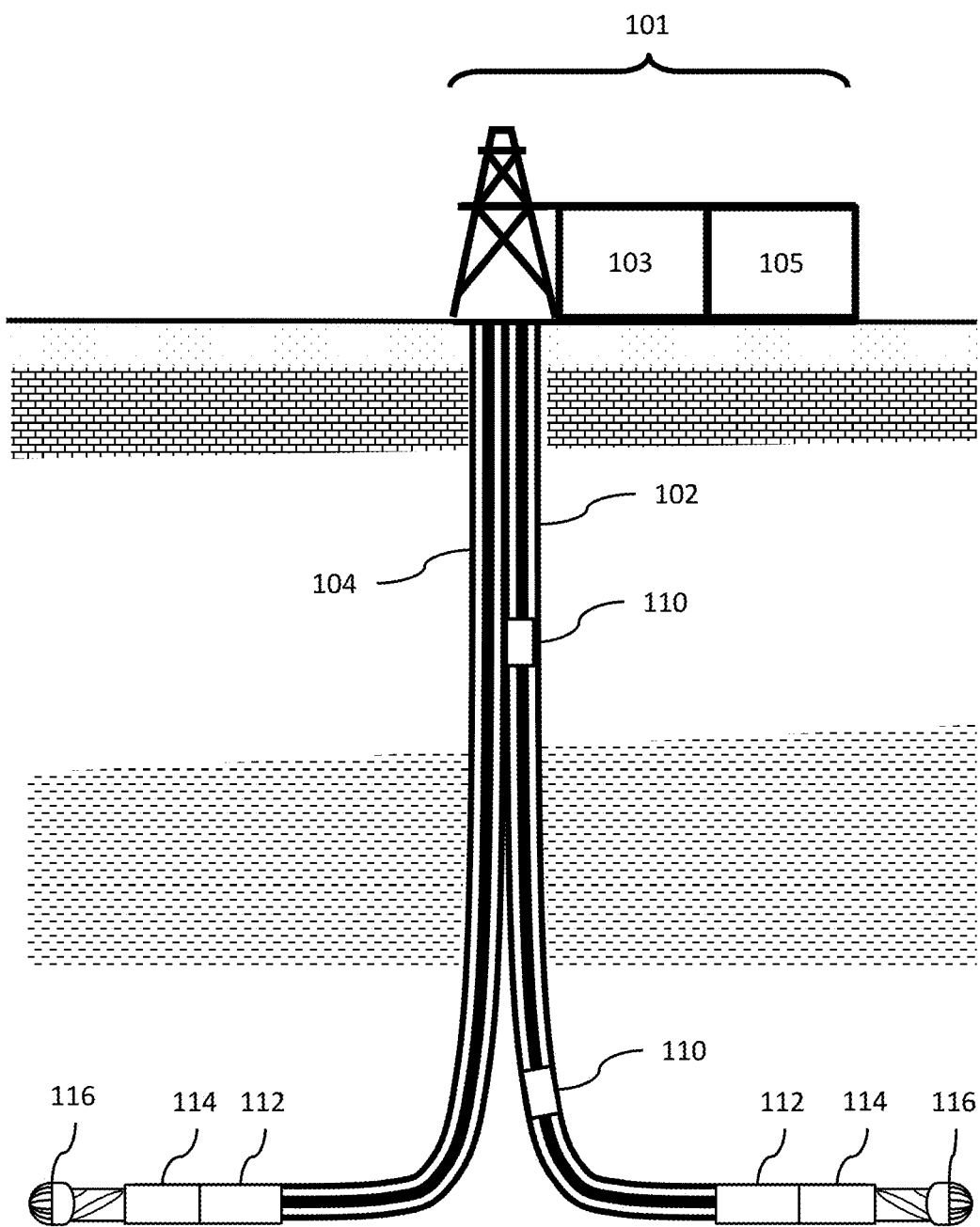
FIG. 1 illustrates an example of drilling operations in according to various embodiments of the present disclosure.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The following examples of certain embodiments of the invention are given. Each example is provided by way of explanation of the invention, one of many embodiments of the invention, and the following examples should not be read to limit, or define, the scope of the invention.

Mitigating drilling dysfunctions in oil-field drilling operations is a priority in the industry. Low-frequency surface data, such as RPM, torque, and acceleration data, are routinely used to mitigate drilling dysfunctions. Recent developments in recording high-frequency surface as well as downhole data provides for better detection, analysis and lead to more rapid mitigation of drilling dysfunctions. Complex Event Processing (CEP) is provided through data acquisition and processing capabilities that are encompassed within embodiments disclosed herein. Real time analytics are possible when tool motion and dysfunction indices are analyzed during drilling operations using signal processing, vibration analysis, CEP and feedback loops, including instructions to mitigate dysfunctions, to rig controls. This leads to efficient acquisition of downhole tool wear indices through monitoring and prediction, which allows for optimized preventive maintenance on all parts of the string. This also allows for an effectively continuous understanding of downhole conditions, resulting in a wellbore that is optimized for completions. Useful indices for the analytics engine include dysfunction indices such as Stick Slip Index (SSI), Bit Bounce Index (BBI), Bit Whirl Index (BWI) and Mechanical Specific Energy (MSE).

The continuous real time acquisition of multiple data streams of conventional and new data types allows for analytic measures for each directly acquired time series as well as the combinations of these data together as rapidly and efficiently as possible. How these measurements change over time and how each measurement data stream changes relative to other data streams provides new analytic tools to understand the drill string dynamics and wellbore conditions as the data are acquired.

Proper merging and analysis of data is integral to understanding CEP and creating rules or learnings applicable to current drilling operations. This merging and comparison of data is impaired when different data types are not synchronized to the same reference time.

In drilling operations, sensors are placed at different wellbore locations, drill string locations and time intervals to provide real-time measurements such as revolutions per minute (RPM), torques, weight-on-bit (WOB) and accelerations. The data acquired with these sensors may be irregularly distributed and subject to transmission losses due to absorption, scattering, and leakage induced by bending effects of the well trajectory. The nonlinear combination of these effects causes an important attenuation or power-loss of signal amplitudes that may compromise the integrity and prediction of dysfunctions taking place at multiple sections of the drill string.

FIG. 1 illustrates an example of drilling a subterranean formation with a first wellbore and a second wellbore according to various embodiments of the present disclosure. The various embodiments disclosed herein are used in the well drilling environment as illustrated in FIG. 1 wherein a well bore 102 is drilled from surface drilling rig facilities 101 comprising a drilling rig, drill string associated surface-based sensors 103 to obtain data from within the wellbore, for example an electronic acoustic receiver attached on the Kelly or BOP, as well as associated control and supporting facilities, 105, which may include data aggregation, data processing infrastructure including computer systems as well as drilling control systems. During drilling operations the well bore 102 includes a drill string comprising an associated bottom hole assembly (BHA) that may include a mud motor 112, an adjustable bent housing or 'BHA Dynamic Sub' 114 containing various sensors, transducers and electronic components and a drill bit 116. The BHA Dynamic Sub acquire time series data such as RPM, torque, bending moment, tension, pressure (ECS) and vibration data. Additionally, the BHA acquires measurement-while-drilling and logging-while-drilling (MWD/LWD) data in high fidelity or standard modes, such as inclination, azimuth, gamma ray, resistivity and other advanced LWD data. Any data acquired with the BHA may be transmitted to the drilling rig 101 through drill string telemetry or through mud-pulse telemetry as time series data.

The drill string may also contain associated sensors, for example mid-string dynamic subs 110 that acquire high fidelity time series data such as RPM, torque, bending moment, tension and vibration data, and these instrumented subs can send signals representing these measurements by telemetry up the drill string where they are also recorded on or near the drilling rig 101.

In various embodiments, it is possible to increase the efficiency for drilling a subsequent well by providing the results acquired drilling the first wellbore 102 to be used in drilling of a second wellbore, such as wellbore 104 of FIG. 1. Model parameters determined from drilling a first wellbore 102, combined with the geometry information and other time series data received by telemetry from the BHA associated with the drill string for the second wellbore 104, may be used to determine the downhole dynamics associated with the drilling operations, so that dysfunctions may be quickly detected and mitigated effectively.

Embodiments disclosed herein provide for data-driven drilling performance optimization. Performance optimization of a drilling operation is a Big Data problem, requiring rapid (real time) integration and analysis of wide varieties and large volumes of data streams. Relevant data are analyzed as rapidly as the data are acquired. Performance optimization translates into safer, more efficient and lower-cost drilling.

Figure 2:
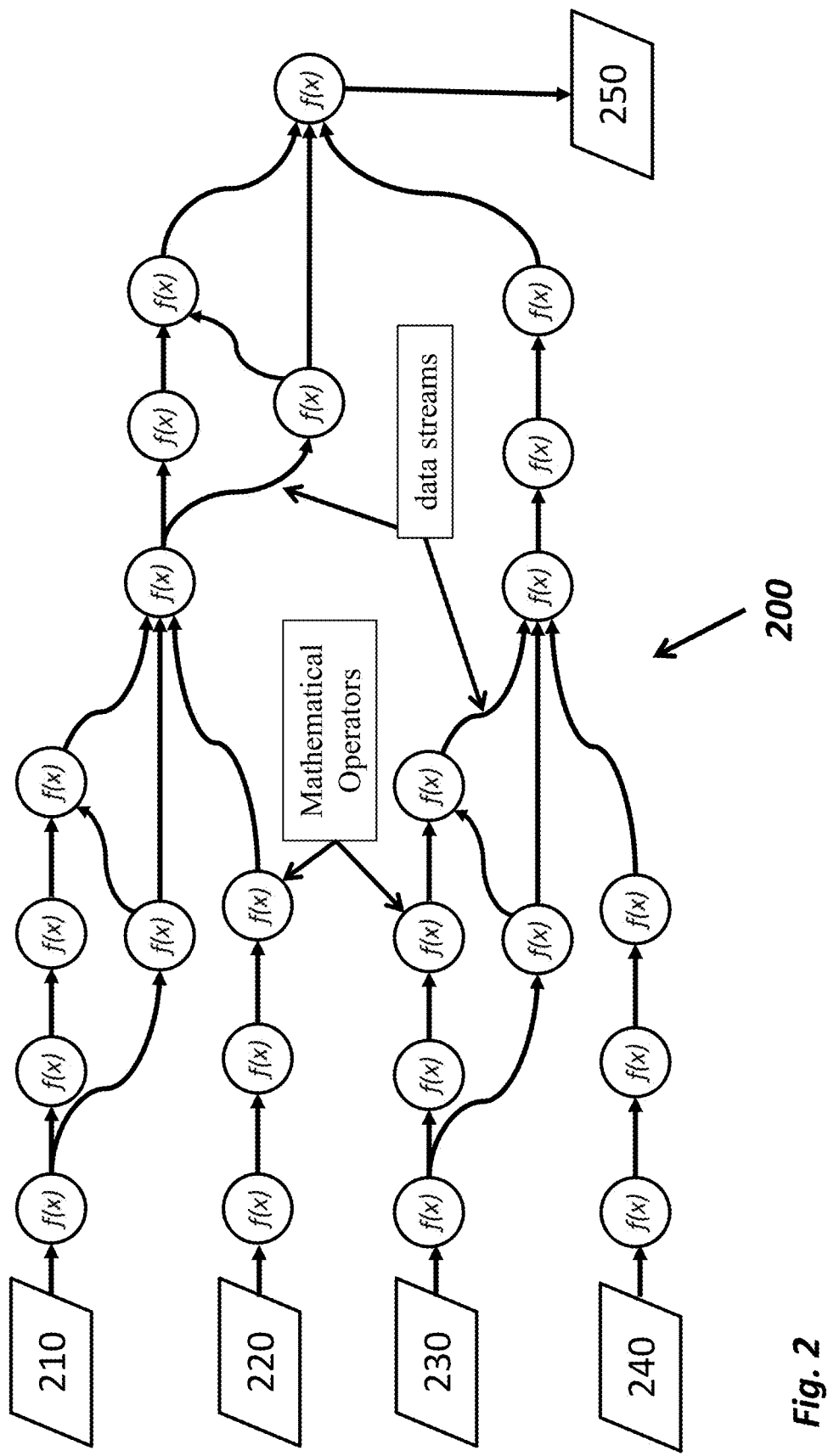
FIG. 2 schematically illustrates a processing graph according to various embodiments of the present disclosure.

Embodiments of a Big Drilling Data Analytics Engine according to the present disclosure provide for a stream computing paradigm to flow data samples through a processing graph of networked mathematical operators, interconnected by data streams. An example processing graph 200 is schematically illustrated in FIG. 2. Data ingestion is continuous with many input data streams, flowing time-ordered and time-registered data samples through the graph to apply continuous analytics. The Analytics Engine (processing graph) is provided access to data from all drilling operation sensors, communication systems and hardware needed to stream data in and out of it. Each mathematical operator is designed, positioned and connected within the flow of data such that the aggregate action of the processing graph yields the desired analyses and output streams at each exit point of the processing graph. FIG. 2 schematically depicts the structure of input data streams to the processing graph, and output analytics and drill rig data control streams for exit 250, though it will be appreciated that a processing graph is not limited to one exit. Output data streams include dysfunction indices, mechanical specific energy, rig state, borehole conditions, toolwear and rig control feedback.

This Big Drilling Data Analytics Engine coordinates in "real time" the flow and analysis of all data streams from wellbore drilling operations. For historical analysis of recorded data, "real time" connotes operations that are executed at least as rapidly as the sample rate of data.

As nonlimiting examples of inputs to the processing graph example of FIG. 2, input 210 may comprise conventional measures for monitoring well drilling operations such as hook load and torque. Input 220 may be high fidelity surface measurements such as RPM, torque, bending, tension, pressure and acceleration. Input 230 may comprise downhole measurements telemetered to the surface such as MWD/LWD, temperature, directional information, data stored in memory, and other 'wired pipe' information both stored and telemetered. Input 240, as a further example, may comprise other data associated with drilling operations such as Quality Assurance/Quality Control data, WellView data and other commercially provided information or data acquired from third party vendors onsite associated with the well operations.

Nonlimiting embodiments comprise data flow coordination and analysis through a processing graph that include real-time ingestion of diagnostic drilling data, feedback and drilling control parameters into a processing graph of networked mathematical operators. Ingestion preserves the time order of the input data streams and registers each sample in the stream with the appropriate clock time. Data flow coordination and analysis includes data formatting for flow through the processing graph, as well as for visualization at strategic positions within the graph and upon exiting the graph 250.

Sampling regularization accounts for variable sample rates from sensors. This regularization accommodates signal processing algorithms and visualization software. For data streams that are downsampled, an anti-aliasing filter may be applied. Bandwidth regularization accounts for variable resolution. Resolution often varies between sensor types, and can distort the results of data mining and analysis if not accounted for.

Data flow coordination and analysis also includes "static" and "dynamic" time corrections to account for differences in time stamps between different sensors. "Static" errors are independent of the time stamp coordinate, "dynamic" errors are time variant. Static errors are most often introduced by human error, when the initial time stamp is set inaccurately for the data stream coming off a sensor. Dynamic timing errors are often associated with clock drift, when the clocks on all sensors associated with rig time series measurements do not run at the same rate.

Dynamic "moveout" corrections may be used to account for a travel time of signal between sensors located at different physical locations. A reference time associated with a particular sensor or sensor group may be arbitrarily selected, such as one at the surface, and all travel times corrected to the reference time, which may involve one or more corrections, including moveout, static or dynamic corrections. More information about synchronization of times across sensor data is provided below.

Data flow coordination and analysis through a processing graph are applied to signal preprocessing of measured data streams to remove uninformative signal components. For example, acceleration sensors attached to rotating equipment may contain uninformative signal components as a consequence of rotation. These contributions are removed in real time to lay bare drilling dysfunction. Vibrationally uninformative components may be targeted for mitigation algorithms. Real-time signal processing also maps the data from local, rotating coordinate systems to global, stationary coordinates.

Embodiments described herein provide for computing an output data stream of "rig state". Rig state is a sample-by-sample automated categorization of ongoing drill rig operations, computed from diagnostic input data streams. Important categories include rotary drilling, sliding, reaming, back-reaming, tripping, etc. Data mining and analysis are supported by incorporating knowledge of rig state for each data sample.

Data flow coordination and analysis through a processing graph also comprises computing an output data stream that characterizes tortuosity of the wellbore, from wellbore position data measured as the well is drilled. Points of high tortuosity in the wellbore generate large contact forces on drill string components, producing undesirable vibration.

Data flow coordination and analysis through a processing graph also includes an energy loss correction of surface-derived data streams to account for attenuation of diagnostic signals travelling to the surface from downhole points of origin or, visa versa, travelling from the surface to a downhole sensor. A weight on bit correction accounts for incomplete transfer of weight applied at the surface to weight on the drill bit. The detection and quantification of drilling dysfunction (typically undesirable vibration and/or fluctuation in weight on bit) may be measured from diagnostic data streams from sensors deployed anywhere from surface equipment, through the drill string, to the bottom hole assembly and drill bit. Torque, acceleration, and tension measurements constitute typical diagnostic data streams for detecting and quantifying undesirable modes of vibration during drilling operations. Dysfunction mitigation algorithms and rig feedback control may focus on minimization of a dysfunction metric computed from input data streams, rather than directly on the input streams.

Data flow coordination and analysis through a processing graph further includes output data streams of rig control instructions for altering rpm, weight on bit applied at the surface, pump pressure, and other controllable drilling parameters, for the purpose of mitigating drilling dysfunction.

Embodiments disclosed herein provide for a Big Drilling Data Analytics Engine that coordinates the flow and conducts the analysis of measured data streams from wellbore drilling operations. Embodiments of the Analytics Engine comprise data-driven drilling performance optimization. Performance optimization in the drilling context includes reduction in undesirable mechanical vibration produced by the drilling operation, with a consequent reduction in trouble time. Drilling performance metrics also include an optimal rate of penetration.

Optimization is achieved through the Analytics Engine by real-time ingestion and analysis of incoming diagnostic data streams. Driven by online data analysis, commands can be issued in real-time to drilling rig controls to alter the RPM of the rotating drill string or, for example, to alter weight applied to the bit. Real-time automated control of RPM or weigh-on-bit parameters requires high-density (for example, 100 samples/second) diagnostic data streams. This Analytics Engine is capable of ingesting and analyzing several hundred high density data streams simultaneously, consistent with what is known as a Big Data problem. These diagnostic data streams may be generated simultaneously from any part of the drilling operation, including sensors deployed downhole or from equipment and operations at the surface.

Drilling optimization may also be achieved through historical analysis of recorded data to improve wellbore design, qualify new drilling technology, and establish data-driven best practices for future drilling. That is to say, the Analytics Engine is agnostic with respect to its source of data. It may be operated onsite in real time from direct sensor input at the drilling location, or, after-the-fact from data recorded in memory during the drilling operation and transmitted to an offsite operations center, or, some combination of the two. When deployed in an operations center receiving information from several concurrent wellbore drilling operation locations, the Big Drilling Data Analytics Engine is capable of simultaneously analyzing high-density data from entire fleets of rigs.

The Big Drilling Data Analytics Engine provides an integrated platform for high-speed data analysis and drilling operations performance optimization. It performs a wide range of interrelated analyses (e.g., signal processing, dysfunction detection/characterization/mitigation, and data mining) in real time. It simultaneously analyzes streaming data from all sensors within the drilling system. The Analytics Engine may be deployed within an offsite operations center or directly on a drilling rig.

Embodiments disclosed herein further provide for predicting real-time drilling dysfunctions at any location of a drill string. The various embodiments disclosed herein provide advantages that include: (a) simplicity to detect and model a wide range of possible power losses through only three parameters; (b) determinations of down hole conditions that are well posed and amenable to stable estimation of parameters at different scales; (c) flexibility for use with different bending functions and signal representations (e.g., mean, envelope values); (d) efficiency for predicting dysfunctions by way of power-loss determinations at any point in time/depth, and therefore useful for measuring and understanding dynamic downhole conditions through measurements acquired at the surface drilling facilities associated with the drill string, so that similarly situated wells may drilled without using mid-string dynamic subs and only using surface acquired data to characterize the dynamic downhole environment during drilling operations.

In drilling operations, sensors are placed at different wellbore locations, drill string locations and time/depth intervals to provide real-time measurements such as revolutions per minute (RPM), torques, weight-on-bit (WOB) and accelerations, etc. The data acquired with these sensors may be irregularly distributed and subject to transmission losses due to absorption, scattering, and leakage induced by bending effects of the well trajectory. The nonlinear combination of these geometrical-related effects causes an important attenuation or power-loss of signal amplitudes that may compromise the integrity and prediction of dysfunctions taking place at multiple sections of the drill string along a wellbore.

An understanding of the laws governing the power-loss along the wellbore enables detection and enables drill rig control mechanisms that may mitigate undesirable vibrations or other conditions to prevent or delay eventual drill bit or BHA failures. The disclosed embodiments provide simple but powerful power-loss models that predict the decay of signal energy under arbitrary bending effects due to the geometries of the well bore. An understanding of the power-loss due to the wellbore geometry provided by this power-loss model facilitates an understanding of the dynamic downhole conditions, including dysfunctions, as the well is being drilled.

The power-loss model depends on a set of three parameters: one parameter, alpha ($\alpha$), for controlling losses along the vertical section (i.e., regardless of bending effects) and two parameters, beta ($\beta$) and optionally gamma ($\gamma$), that controls the trade-off between exponential and hyperbolic signal decays for a given bending function or wellbore geometry.

The power-loss model combines analogs of slab (rigid) and fiber (soft) model losses that are similar to models proposed in Optics [Hunsperger, 2009] and Photonics [Pollock, 2003]. The presently disclosed embodiments comprise, but are not limited to, three different bending functions relative to wellbore geometries that may be described by mathematical relationships using $\alpha$, $\beta$ and $\gamma$: 1) a geometrical tortuosity, 2) cumulative dog-leg and 3) clamping efficiency.

Borehole tortuosity is inherent to drilling and is the undulation or variance from the planned well bore trajectory, such as spiraling in vertical sections or a slide-rotary behavior in horizontal sections. A dog-leg is a crooked place in a wellbore where the trajectory of the wellbore deviates from a straight path. A dog-leg may be created intentionally in directional drilling to turn a wellbore to a horizontal path, for example with nonconventional shale wells. The standard calculation of dogleg severity is expressed in two-dimensional degrees per 100 feet, or degrees per 30 meters, of wellbore length.

The increasing use of sensors in real-time downhole operations is useful to investigate the wellbore environment during the drilling process and to measure the actual geometry of the wellbore. The possibilities for modeling power-loss of signals travelling up the drill string as a result of wellbore geometry may now be addressed in instrumented drilling practices. The models are generally governed by exponential decay functions. These functions may adopt different forms to accommodate different types of materials, to capture other loss sources on bending geometries such as those produced by micro-bending and sudden or relatively rapid changes in curvature.

Advantages of the bending function models disclosed herein include: (a) simplicity to accommodate a wide range of possible losses through various mathematical descriptions using combinations of three model parameters, herein designated as $\alpha$, $\beta$ and $\gamma$; (b) a well posed model or model group that is amenable to stable estimation of its parameters at different scales; (c) flexibility to be used with different bending functions and signal representations (e.g., mean, envelope values); and (d) efficiency for predicting dysfunction using the power-loss at any point in time/depth along the drill string leading to efficient and timely dysfunction mitigation.

Low-frequency surface data, such as RPM, weight-on-bit (WOB), torque on bit (TOB) and acceleration data are routinely used to discover and mitigate drilling dysfunctions. However, recent developments in recording high-frequency surface and downhole data adds a new dimension to better understand drilling dysfunctions. Wave optics and photonics literature provide analogs useful for understanding transmission losses such as absorption, scattering and leakage through different materials that are subject to bending effects, such as are imposed by the geometries within a wellbore.

In general, a loss that is due to curvature and other geometrical considerations in the well bore may be described by: $P(z)=P(0) \cdot e^{-az}$, where P is power loss, z is depth and a is propagation of signal strength in the drill string, so that $$a = -\frac{1}{P(z)} \frac{dP(z)}{dz}.$$

Assuming that all propagation constants can be combined together and phase effects omitted, the signal propagation, a, may be expressed as $a = \alpha \cdot e^{-\beta \cdot R}$ (for the slab model case, useful for modeling over relatively short distances) and as $a = \alpha \cdot R^{-1/2} e^{-\beta \cdot R}$ (for the fiber model case, useful for modeling over larger distances) where R is the radius of curvature, a is a situationally dependent magnitude constant, $\beta$ and $\gamma$ are parameters related to bending or radius in an exponential or hyperbolic sense.

Various embodiments of the present disclosure provide a Hybrid Slab/Fiber Model for Power-Loss. The disclosed model includes an exponential coefficient that decays as a mix of exponential and hyperbolic trends from a bending model wherein $$P(z=0)=P(z) \cdot e^{-a(\tau)z} = P(z) \cdot e^{-\alpha e^{-\beta \tau} \tau^{-\gamma} z}$$

where $\tau$≡clamping efficiency. Note that for $\tau \approx 0 \Rightarrow P(z=0) = P(z) \cdot e^{-\alpha z}$, which is the attenuation model on a straight domain, such as the initial vertical section of the well bore construction.

The two-step parameter estimation: (1) $\ln(P_{0,j}/P_{i,j})+a_i z_i=0$ for $i=1, 2, \ldots, N_z; j=1, 2, \ldots, N_s$ and (2) $a_i = ae^{-\beta \tau_i} \tau_i^{-\gamma}$, being the three-parameter problem to account for combined slab/fiber effects where i is the index over depth and j indexes over survey stations.

The implementation of various preferred embodiments for characterizing or modeling the power-loss dysfunction includes an option to select or model a selected bending function (i.e., geometrical tortuosity, dog-leg and clamping efficiency). Also, options to experiment with different fitting options may be derived using these model parameters. In addition, it is possible to define fitting geometries from any given starting depth. There are also definitions provided by applications of the model parameters for different smoothing and filtering options. Slab and fiber models are available to estimate power-loss by inversion using a combination of surface sensor time series data compared to equivalent downhole sensor time series data. Regressions can be performed on data for any sensor or aggregated data from some or all sensors.

Figure 3:
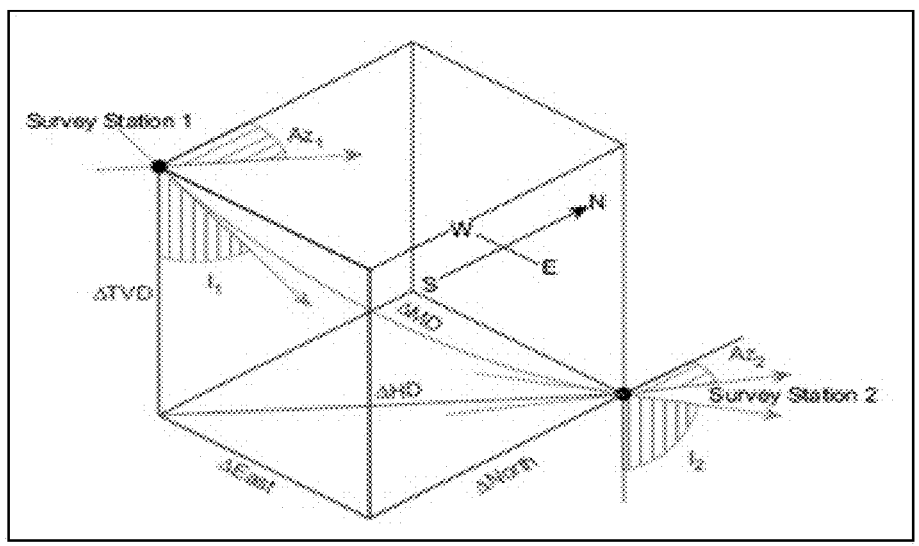
FIG. 3 illustrates parameters related to a geometrical tortuosity bending function.

The geometrical tortuosity bending function, $\theta$, may be given by $$\vartheta_k \equiv 1 - \frac{l_k}{z_k} = 1 - \frac{\|TVD_k, NS_k, EW_k\|_2}{MD_k},$$

where $l_k$ is an idealized length from one subsurface survey station position to the next subsurface survey station position and $z_k$ is the actual distance along the actual geometry length of the drilled wellbore. The numerator and denominator of the last term of this equation are illustrated in FIG. 3. The cumulative dogleg bending function, δ, is given by:

$$\delta_k = \arccos(\cos(i_{1,k}) \cdot \cos(i_{2,k}) + \sin(i_{1,k}) \cdot \sin(i_{2,k}) \cdot \cos(Az_{2,k} - Az_{1,k})) \cdot \frac{100}{MD_k}.$$

As illustrated in FIG. 3 the geometrical tortuosity bending function, θ, from Survey Station 1 to Survey Station 2 is measured two ways, which comprise the numerator $\|TVD_k, NS_k, EW_k\|_2$ and the denominator MDk. The denominator is the actual geometry as measured along the wellbore between Survey Station 1 and Survey Station 2, for example using data acquired from a BHA, while the numerator is the idealized measurement based on the square root of the sum of the squares of the vertical distance ($TVD_k$), the North to South distance ($NS_k$) and the East to West distance ($EW_k$), also taking into consideration the azimuth $Az_1$ and inclination $I_1$ of the drill string at Survey Station 1 and the azimuth $Az_2$ and inclination $I_2$ of the drill string at Survey Station 2.

Figure 4:
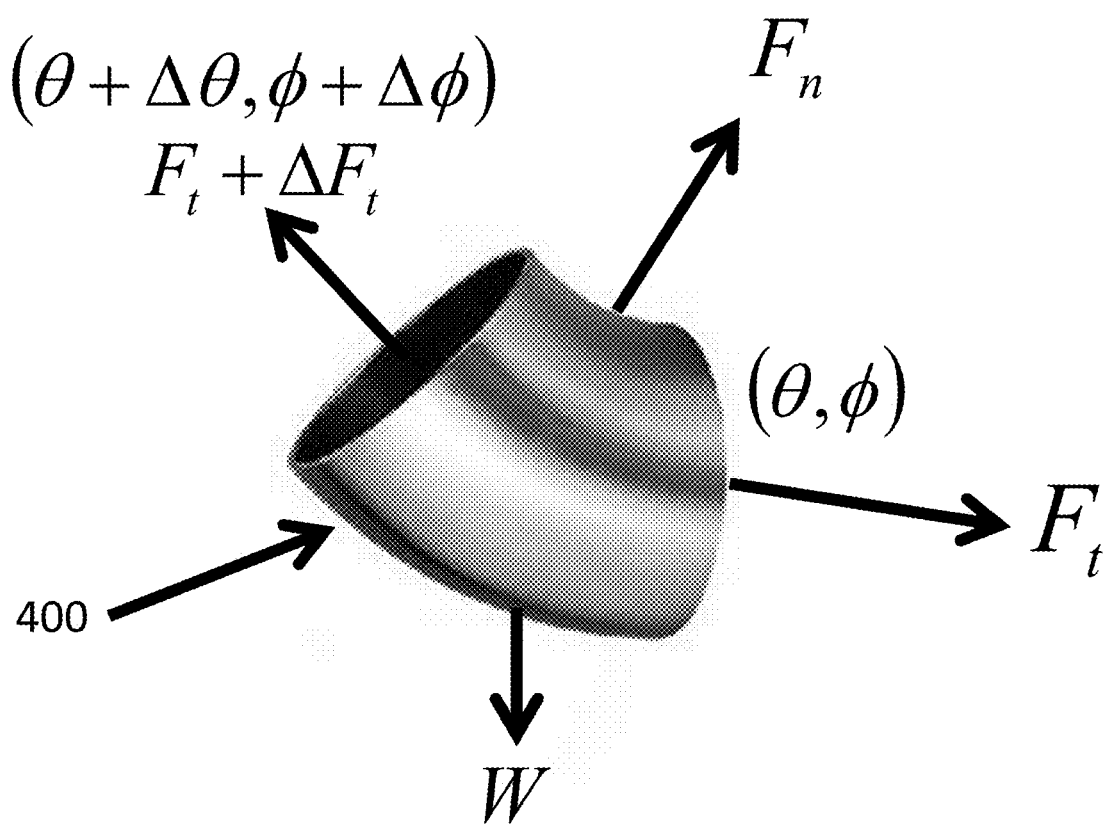
FIG. 4 illustrates forces relative to a bending drill pipe.

To further analyze a bending function in a wellbore, clamping efficiency parameters may be described in physics-based formulation where forces acting on the drill pipe 400 are viewed as illustrated in FIG. 4 at the bend in the trajectory designated as (θ, Ø) inclination and azimuth, respectively. The force along the trajectory of the drill string is $F_t$, for the tensional or transverse forces on the drill string in the direction of the wellbore trajectory, while the force normal to the wellbore trajectory at that point is $F_n$. The force in the other directions from the trajectory of the drill string trajectory at the bend is $F_t + \Delta F_t$, which forces are associated directionally as (θ+ΔØ, α+ΔØ) due to the bending. The weight of the drill string is designated W. With these parameters the forces may be combined to describe the clamping efficiency, analogous to a form of resistance by the wellbore to the drilling operations due to the drill string's interaction with the wellbore geometry:

$$\tau^2 = \frac{F_n^2}{F_t^2} = (\Delta\emptyset \sin\theta)^2 + \left(\Delta\theta + \frac{W}{F_t}\sin\theta\right)^2 \approx (\Delta\emptyset\sin\theta)^2 + \Delta\theta^2.$$

Figure 5:
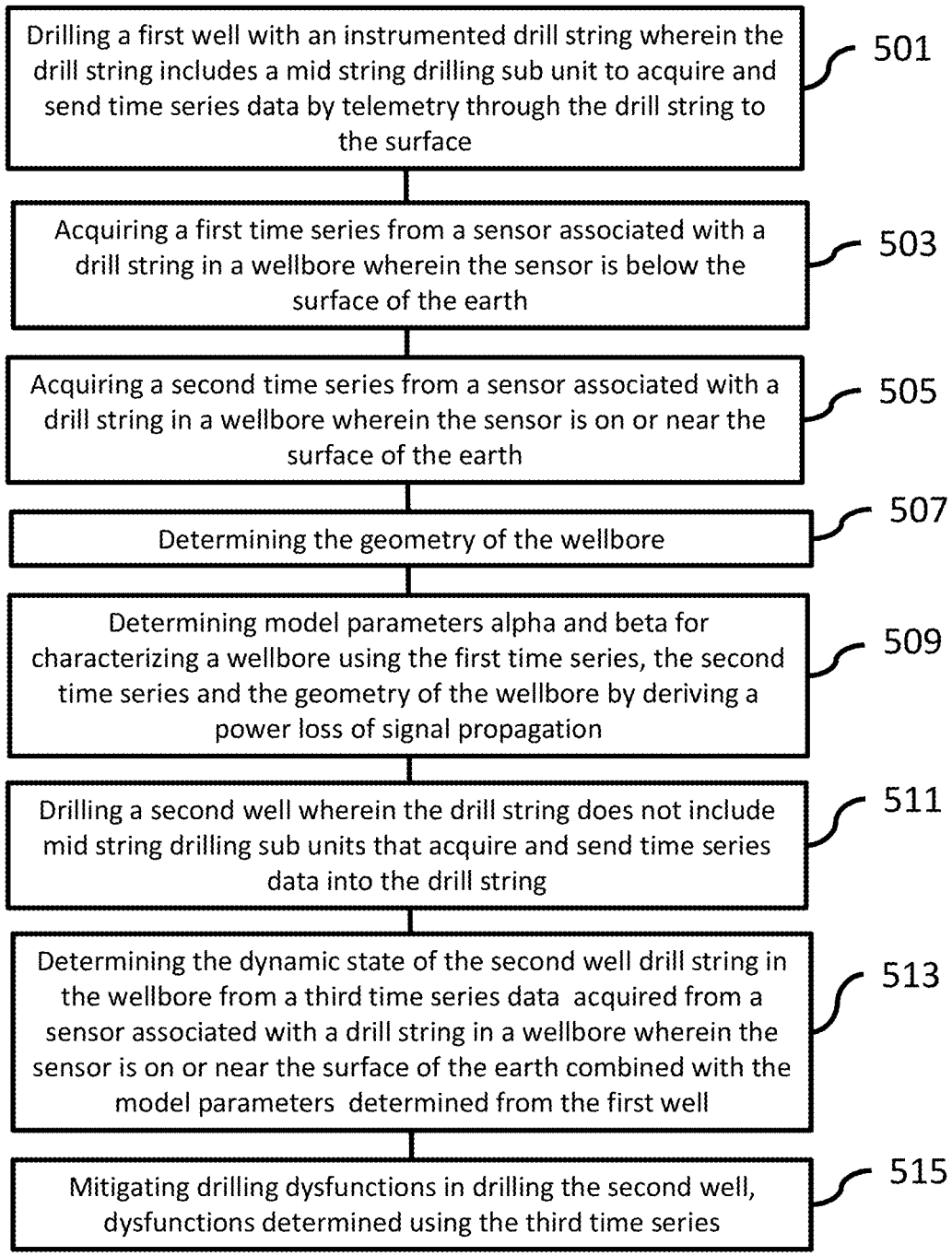
FIG. 5 illustrates a process for determining real-time drilling dysfunctions by measuring power-loss of signal propagation associated with a drill string according to various embodiments of the present disclosure.

FIG. 5 illustrates a process for determining real-time drilling dysfunctions by measuring power-loss of signal propagation associated with a drill string. A (first) well is drilled with an instrumented drill string wherein the drill string includes a mid-string drilling sub unit (for example a torque and tension sub) to acquire, store and send time series data by telemetry to the surface 501. A first time series is acquired from a sensor associated with a mid-string drilling sub unit in a wellbore wherein the sensor is below the surface of the earth 503. A second time series is acquired from a sensor associated with a drill string, the drill string in a wellbore, wherein the sensor associated with the drill string is on or near the surface of the earth, for example associated with an acoustic receiver attached to the Kelly or other rig component for acquiring the signal. A geometry of the wellbore is determined, 505, from data acquired from a bottom hole assembly that is telemetered to the surface. Model parameters that describe the wellbore signal propagation power losses due to geometrical effects are determined using the first time series, the second time series and the geometry of the wellbore to derive model parameters alpha and beta that characterize a power loss of signal propagation for signal travelling through the drill string based on attenuation caused by the geometry of the wellbore 509 among other dynamic effects. The differential power-loss between various sensors at various locations may aid characterization. Analysis of the differential power-loss effects of various time-series comparison allows for detection and then mitigation of drilling dysfunctions. A second well may be drilled wherein the drill string does not include mid string drilling sub units that acquire and send time series data into the drill string 511. The dynamic state of a second well drill string in a second wellbore may be determined from a third time series data acquired from a sensor associated with a drill string in a wellbore, wherein the sensor is on or near the surface of the earth (i.e., associated with an acoustic sensor on the Kelly), and the third time series data are combined with BHA telemetered data and the model parameters determined from the first well 513. Drilling dysfunctions in drilling the second well may be detected and mitigated using the third time series 515, the model parameters derived from the first wellbore and the geometry of the second wellbore.

Figure 6:
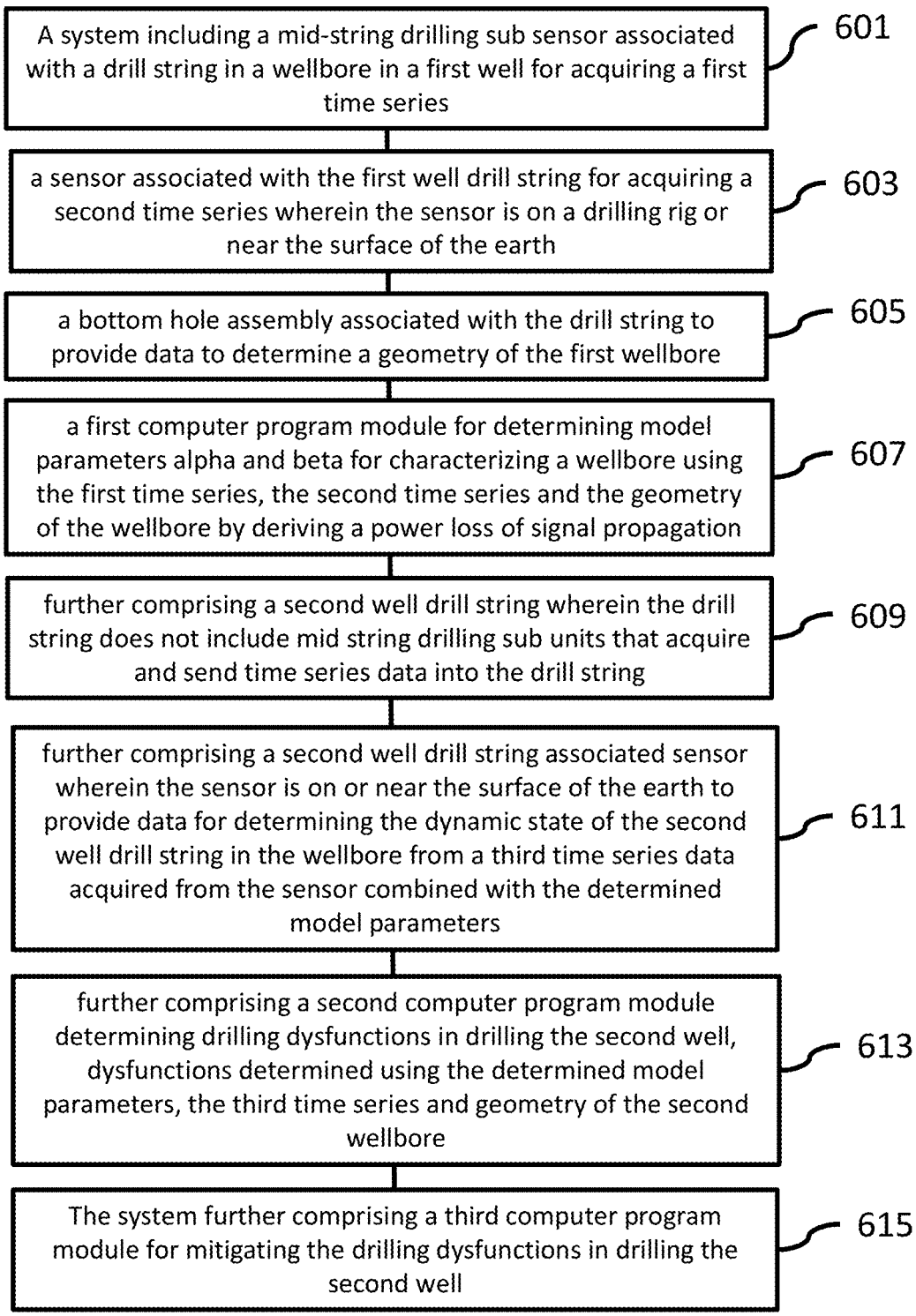
FIG. 6 illustrates a system associated with a drill string in a wellbore for acquiring a time series according to various embodiments of the present disclosure.

FIG. 6 illustrates a system including a mid-string drilling sub sensor (110) associated with a drill string in a wellbore in a first well for acquiring a first time series 601. A sensor associated with the first well drill string for acquiring a second time series wherein the sensor is on a drilling rig or near the surface of the earth 603. A bottom hole assembly 112, 114, 116 associated with the drill string in a well bore 102 provides data to determine a geometry 605 of the first wellbore 102. A first computer program module determines model parameters, using the first time series, the second time series and the wellbore geometry, to derive model parameters alpha and beta that characterize a power loss for signal propagation signal travelling through the drill string, 607. Optionally, the system may further comprise a second well drill string in a well bore 104 wherein the drill string does not include mid string drilling sub units that acquire and send time series data into the drill string, 609. Optionally, the system may also further comprise a second well drill string associated sensor 103 wherein the sensor is on or near the surface of the earth (for example an acoustic sensor associated with the Kelly) to provide data for determining the dynamic state of the second well drill string in the wellbore from a third time series acquired from the sensor combined with the determined model parameters from the first well, 611. The system may further comprise a second computer program module determining drilling dysfunctions in drilling the second well, dysfunctions determined using the determined model parameters from the first well, the third time series and geometry of the second wellbore as derived from the BHA data associated with the second drill string, 613. The system may further comprise a third computer third computer program module for mitigating the drilling dysfunctions in drilling the second well 615.

Figure 7:
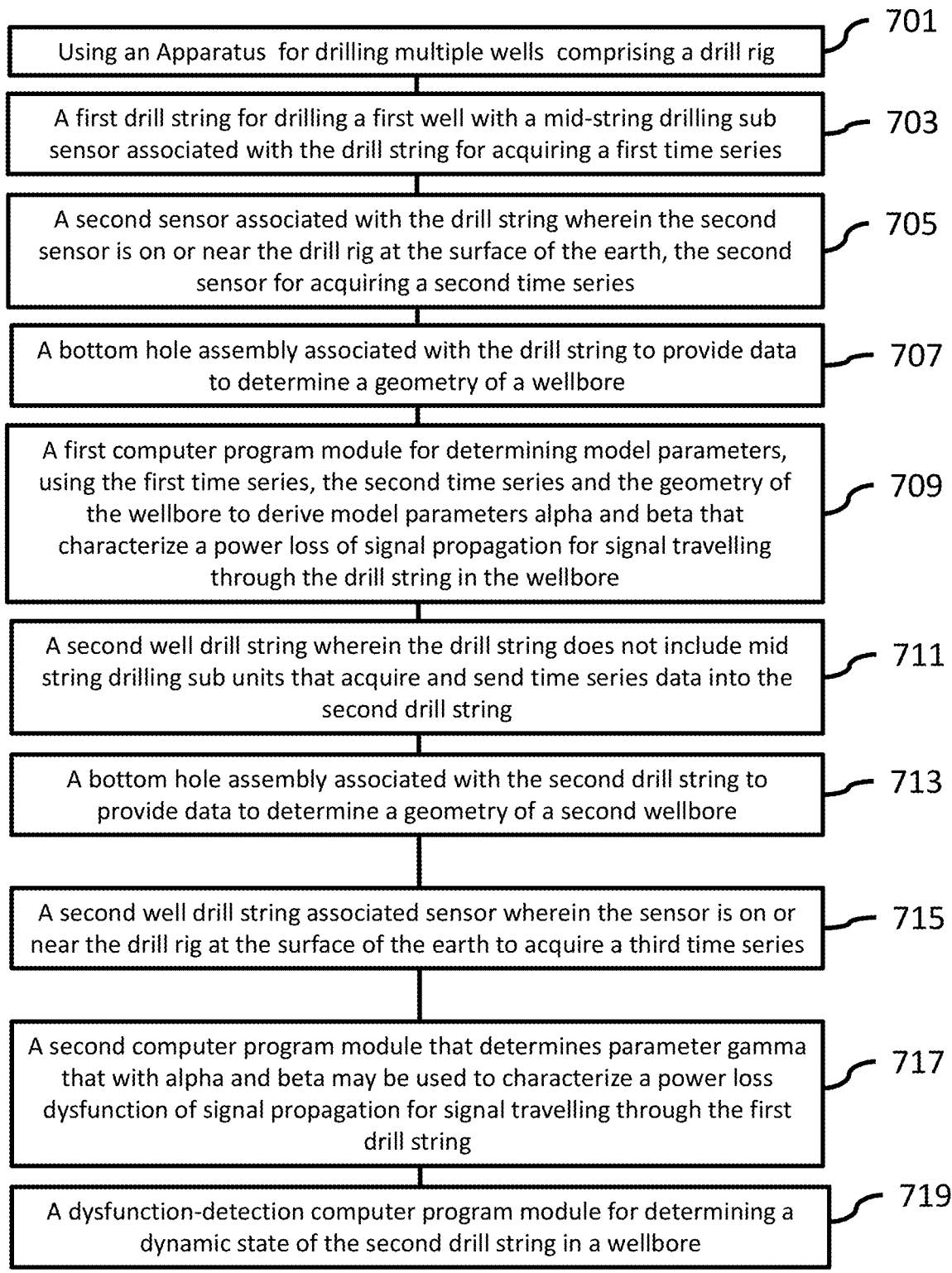
FIG. 7 illustrates the use of a drilling apparatus for drilling multiple wells according to various embodiments of the present disclosure.

FIG. 7 illustrates the use of a drilling apparatus for drilling multiple wells 701 comprising a drill rig 101 with a first drill string in a well bore 102 for drilling a first well with a mid-string sub sensor 110 associated with the drilling string for acquiring a first time series 703. A second sensor 103 associated with the drill string in a well bore 102 wherein the second sensor is on or near the drill rig 101 at the surface of the earth, the second sensor for acquiring a second time series 705. A bottom hole assembly 112, 114, 116 is associated with the drill string to provide data to determine a geometry of a wellbore associated with drill string in a well bore 102. The apparatus comprises a first computer program module for determining model parameters (alpha, beta and optional gamma), using the first time series, the second time series and the geometry of the wellbore to derive model parameters alpha and beta that characterize a power loss of signal propagation for signal travelling through the drill string in the wellbore 709. A second well may be drilled wherein the drill string in a wellbore 104 does not include a mid-string drilling sub unit 711. A bottom hole assembly 112, 114, 116 may be associated with the second drill string in a well bore 104 to provide data to determine a geometry of a second wellbore 713 and to provide time series data for comparison with a drill string associated sensor on the surface 103, providing a third time series 715 in order to derive signal power loss along the drill string in the wellbore and to determine drilling dysfunctions as the well is being drilled. After deriving the parameters alpha and beta, these parameters may be used in the drilling of a second well wherein the geometry data of the second well, the third time series data (such as from sensor 103) combined with BHA provided time series data to derive power loss information related to the second wellbore may be inverted to detect and then mitigate drilling dysfunctions in drilling operations. In addition, a second computer program module may determine parameter gamma that with alpha and beta may be used to characterize a power loss of signal propagation for signal travelling in either the first or the second drill string. Using combinations of these parameters, a dysfunction detection computer program module may determine a dynamic state of the second drill string in a wellbore. When a drilling dysfunction is detected, measures may be taken to mitigate the dysfunction.

Embodiments disclosed herein further include synchronizing times among many different sensors and data types that may be ingested by an analytics engine, for example a processing graph 200 as in FIG. 2. The drilling industry has a need to optimize downhole data acquisition operations that properly synchronize or correct timing differences between various time series measurements. Considerable efforts in manual operations are used in the field to synchronize or adjust time differences between surface and downhole sensors. However, these manual time-adjustment operations are not just slow, they are known to open up potential human errors during the field data acquisition phase.

For example, each sensor may have its own internal clock. In an ideal world, the field operation is able to synchronize the clocks of all surface and downhole sensors simultaneously to ensure that each clock starts at the same time and/or all time differences are known. However, in practice, the synchronization is not done during field operations. A surface sensor often does not synchronize or cannot be synchronized with downhole sensors, or the clocks of downhole sensors start at different time. This non-synchronization of the clocks creates time misalignment between surface and downhole measurements. This timing error may range from minutes to hours.

Another major source of timing error relates to clock drift of each sensor where a sensor associated clock or timer does not run at the same speed compared to another clock. That is, after some time the clock "drifts apart" in time from the other clock. The timing of various sensors may drift relative to other timing devices for any number of reasons, including physical composition, temperature, pressure, power variations and timer quality. Timing drift may vary at different rates arbitrarily. The timing error of the clock drift may range from seconds to minutes.

To correct the timing error due to the non-synchronization of the clocks, the drilling industry often employs a manual method to correlate downhole data to surface data, assuming surface data to be a reference signal because surface data are always available, usually convenient to use and synchronize with a main clock, therefore it is often most convenient to use a surface associated clock as a reference signal. However, the manual method is labor-intensive, error prone, and less accurate depending on a person's judgment and preferences. Since the clock drift is difficult to determine manually, the drilling industry frequently ignores or approximates this correction.

To avoid the manual corrections of timing errors, embodiments disclosed herein provide automatic methods of one or several steps to correct time misalignments among surface and downhole data. After the corrections, all the measurements are represented correctly relative to a reference clock, and therefore all measurements are substantially synchronized in time. Substantially synchronized in time will be understood to mean within one or two standard deviations of the measurement error. This facilitates easy and accurate comparisons among all sensors and data sets. The application of time adjustments consists of three key corrections: 1) correcting for the non-synchronization of the clocks based on cross-correlation method, 2) correcting for clock drift based on a dynamic cross-correlation method or a dynamic time warping method, and 3) travel-time path correction between surface and downhole sensors based on a "linear moveout correction." The benefits of this multistep application give accurate corrections of timing errors and drastically speed up the processing time, which avoids labor-intensive and error-prone methods currently employed in the drilling industry. After the corrections, all the measurements are represented correctly relative to a reference clock.

The following outlines the framework for automatic corrections of timing errors needed to compensate downhole data. There are numerous time-shift methods that can be applied to compute the time corrections. For example, it may be preferable to initially use a time-shift method based on cross-correlation. In signal processing, cross-correlation is a measure of similarity of two waveforms as a function of a time-lag that gives a measure of time adjustment that may be applied to one of them. For discrete real time series of f(t) and g(t), the cross-correlation is defined as (Oppenheim and Schafer, 1989; Telford, et al. 1976): $C(\tau)=\Sigma_{n=0}^{N}f(n\Delta t)*g(n\Delta t+\tau)$, where $C(\tau)$ denotes the cross-correlation function, $\tau$ is the displacement of g(t) relative to f(t), termed as the time lag, $\Delta t$ is the time sample rate, and n is a time sample index.

In some embodiments, the data segment utilizes a time interval to drill at least 2 stands of drill pipe. Each drill pipe is approximately 90 feet. It typically takes 3 to 5 hours to complete drilling 2 stands of drill pipe. Where there is a new addition of a drill pipe, the values of the time series normally reduce to zero, creating a step function. The cross-correlation of the time series that include those step functions gives an accurate and robust estimation of the time correction.

For example, f(t) may correspond to surface data and g(t) represents downhole data. A time shift is found by the maximum of the cross-correlating function of C ($\tau$). The time shift is applied to all data to correct for non-synchronization of all clocks with the reference clock (typically a surface clock). As an example, the data length (N$\Delta$t) taken into the cross-correlation process may be about 3 to 5 hours at a time, but of course varies by the situation. This process is repeated until the end of the data set.

Figure 8:
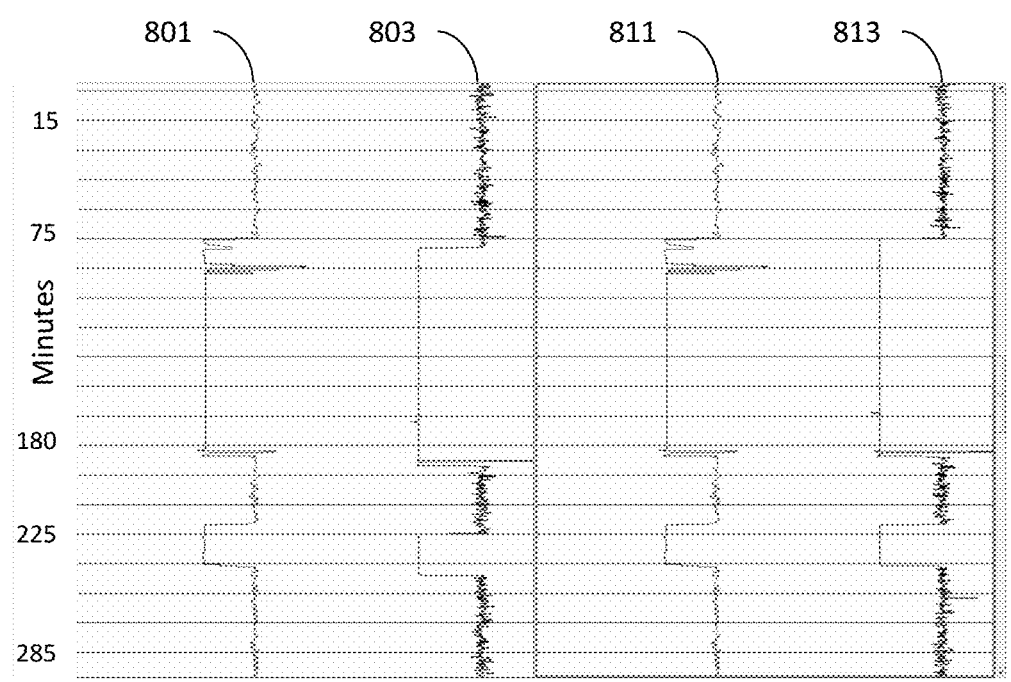
FIG. 8 illustrates an example of time-series data before and after time correction of the data according to various embodiments of the present disclosure.

FIG. 8 illustrates an example of time-series data before and after time correction of the data, with a surface clock as the reference. Time series 801 is transducer data representing Surface measured Revolutions per Minute (RPM) associated with a surface reference clock. Time series 803 is transducer data obtained from a sensor in the wellbore, associated with the drill string, also measuring RPM. An addition of a drill pipe occurs around 75 minutes showing an illustrated example of a step function. After applying cross-correlation as described, a time shift is obtained to be applied to adjust the time of the wellbore sensor RPM data to the surface time series associated reference time. Time series 811 is the same transducer RPM time series data 801 associated with a surface reference clock and time series 813 is the wellbore sensor RPM data after the time adjustment determined from cross-correlation has been applied.

Another method that may additionally be used to correct clock drift uses a dynamic cross-correlation method that is similar to the cross-correlation method. The key difference is the use of a smaller overlapped-time window to compute a time shift. For example, a typical window size for dynamic cross-correlation is 30 minutes with a 50 percent overlapped window; however, the overlap will be dependent on the situation and the amount of clock drift.

Figure 9:
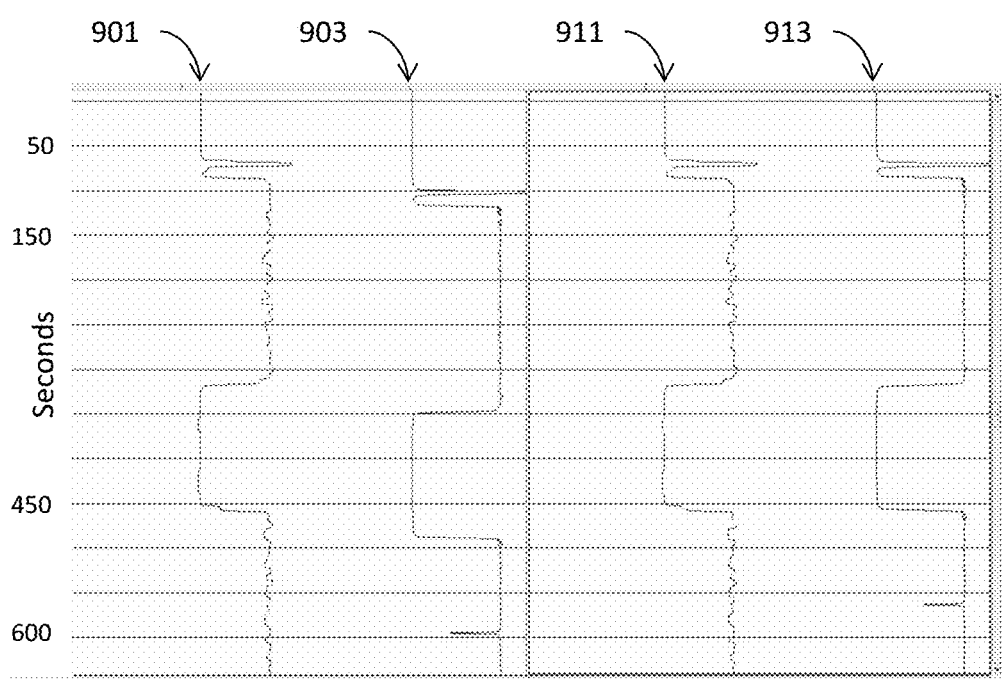
FIG. 9 illustrates an example before and after clock-drift correction of downhole data according to various embodiments of the present disclosure.

Another method to correct clock drift uses a dynamic time warping method (Hale, 2013) that computes a sample-by-sample time shift. This method can give excellent matches between surface and downhole measurements. FIG. 9 illustrates an example before and after clock-drift correction of downhole data to a surface reference clock by the dynamic time warping method. Time series 901 is transducer data representing a Surface measured RPM associated with a surface reference clock. Time series 903 is transducer data obtained from a sensor in the wellbore, associated with the drill string, also measuring RPM. After applying the dynamic time warping as described, a time shift series of adjustments is obtained to be applied to adjust the time of the wellbore sensor RPM data. Time series 911 is the same transducer RPM time series data 901 associated with a surface reference clock and time series 913 is the wellbore sensor RPM data after the time adjustment determined from cross-correlation has been applied.

Another time adjustment may be added because downhole-sensor locations vary in depth. For sensors associated with a drilling string, the linear moveout correction accounts for travel time in which the signal travels from one sensor location in depth to the next sensor and/or to the surface. The correction $\Delta T$ is computed as: $\Delta T = Z/V$, where Z is the distance from the downhole sensor location to surface, and V is a velocity of signal propagation, which may be the velocity of the steel pipe, the drill string or the velocity of a signal through a conductor of wired pipe. The $\Delta T$ correction is dynamic and changes as the depth of the sensor increases.

Figure 10:
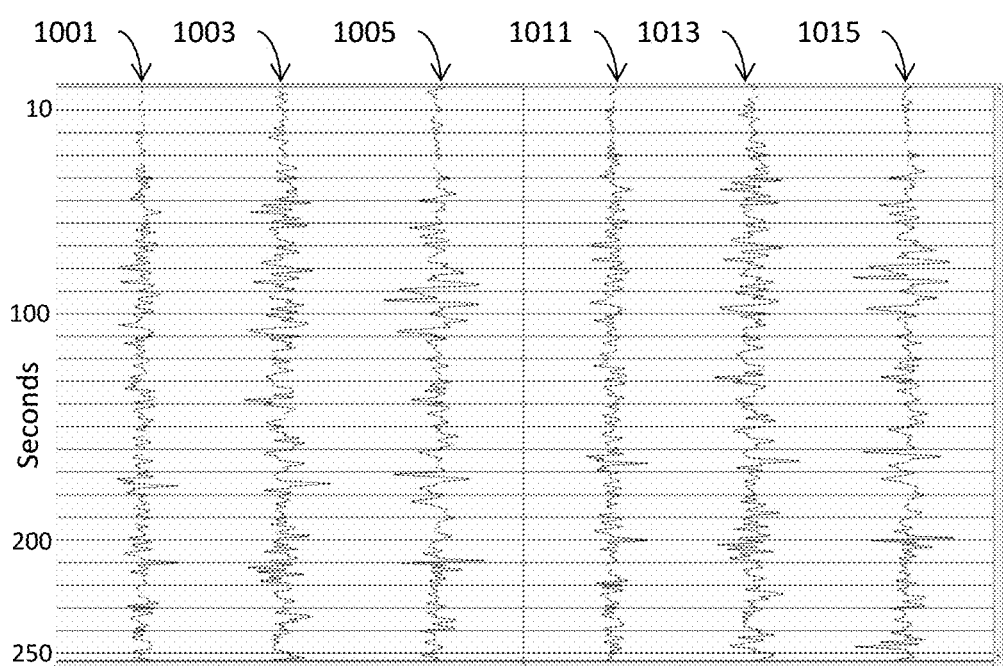
FIG. 10 illustrates an example before and after linear moveout correction of data acquired from downhole transducers according to various embodiments of the present disclosure.

FIG. 10 illustrates an example before and after linear moveout correction of data acquired from downhole transducers, in this case accelerometers. Time series 1001, 1003 and 1005 are downhole acceleration time series data acquired from sensors in the wellbore, for example in or on the drill string. After application of the linear moveout time adjustment correction described, time series data 1011, 1013 and 1015 are illustrated such that the data are substantially closer to synchronous in time relative to, for example, a surface associated reference time. Other time adjustments may be added after this linear moveout correction, such as the cross-correlation or time warp methods.

Figure 11:
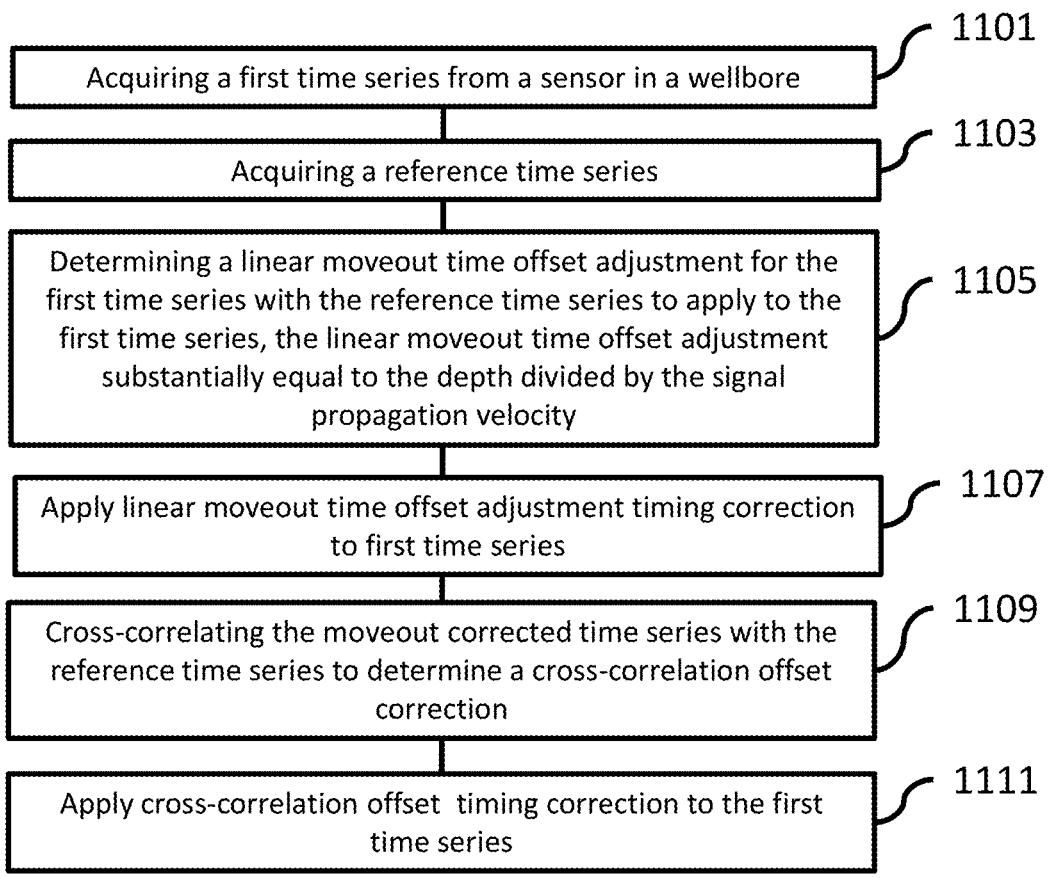
FIG. 11 illustrates a method according to embodiments of the present disclosure for adjusting time series data relative to a reference time according to various embodiments of the present disclosure.

FIG. 11 illustrates a method according to embodiments of the present disclosure for automatically adjusting time series data relative to a reference time. A first time series is acquired from a downhole sensor 1101. A reference time series is acquired, which may be acquired using a surface transducer related time series with a known relationship to a reference time 1103. A linear moveout time series is determined to adjust the first time series due to the downhole sensors being variable in depth. The linear moveout time offset adjustment is equal to the depth of the downhole sensor divided by signal propagation velocity 1105. Then the linear moveout offset correction may be applied to the first time series 1107. The first time series and the reference time series may be cross-correlated to determine a cross-correlation time offset correction to apply to the first time series 1109, and the cross-correlation time offset correction is applied 1111 to obtain a cross-correlation corrected time series.

Figure 12:
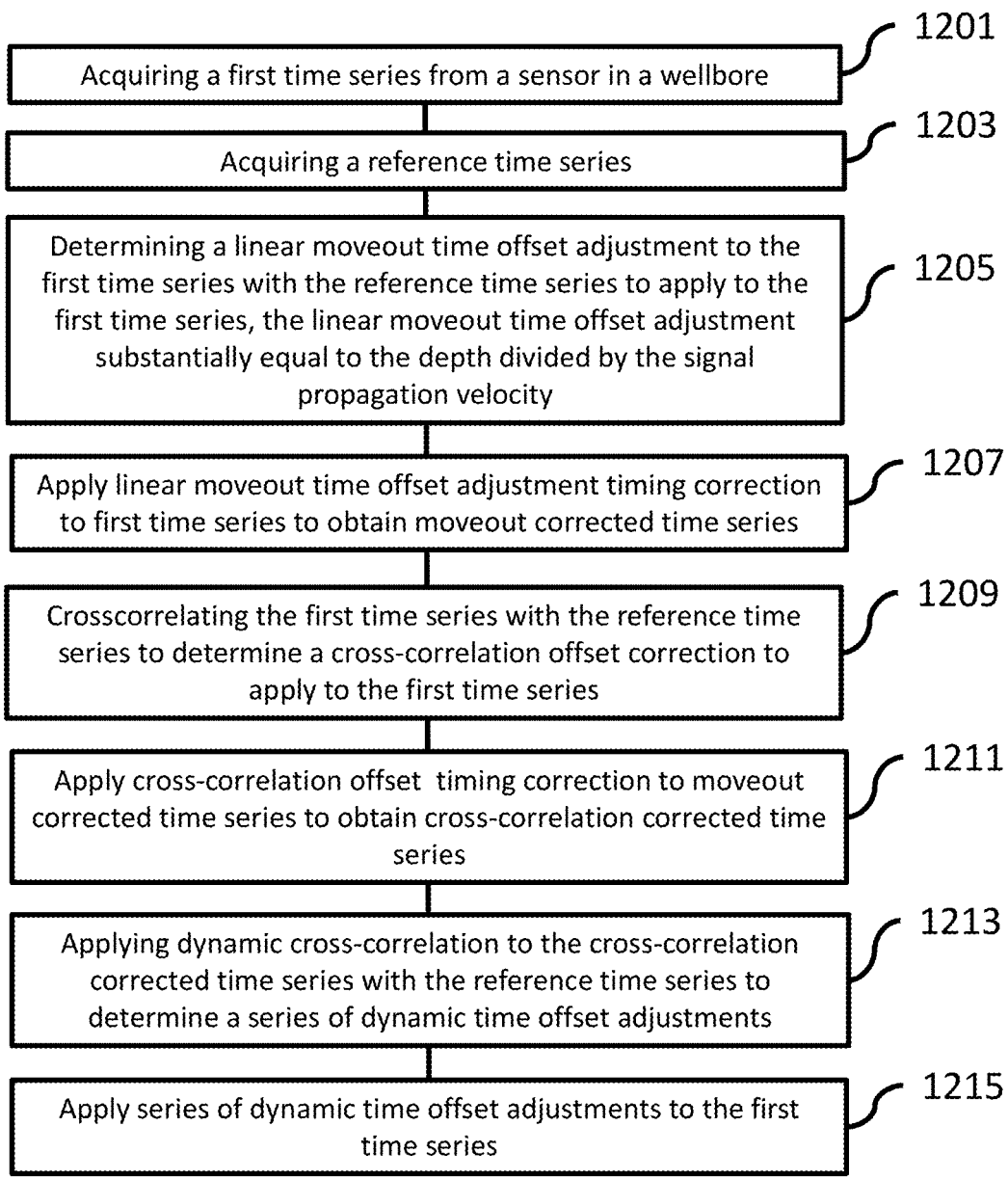
FIG. 12 illustrates a method according to alternative embodiments of the present disclosure for adjusting time series data relative to a reference time according to various embodiments of the present disclosure.

FIG. 12 illustrates a method according to alternative embodiments of the present disclosure for automatically adjusting time series data relative to a reference time. A first time series is acquired from a downhole sensor 1201. A reference time series is acquired, which may be acquired using a surface transducer related time series with a known relationship to a reference time 1203. A linear moveout time series offset adjustment is determined to adjust the first time series due to the downhole sensors being variable in depth. The linear moveout time offset adjustment is equal to the depth of the downhole sensor divided by signal propagation velocity or drill string 1205. The linear moveout time offset adjustment is applied to the first time series to obtain a moveout corrected time series 1207. The first time series and the reference time series are cross-correlated to determine a cross-correlation time correction to apply to the first time series 1209. The cross-correlation time correction is applied to the first time series 1211, to obtain a cross correlation corrected time series. To correct for clock-sensor drift, a dynamic cross-correlation may be applied to the first time series with the reference time series to obtain dynamic cross-correlation time offset adjustments to apply to the first time series 1213. Alternatively, the dynamic time warping process may be used to determine adjustments to the data for clock drift. The dynamic cross-correlation time offset adjustments are applied to the cross-correlation corrected time series to obtain dynamically adjusted time series 1215. In the case dynamic time warp adjustments were determined, they can be applied to the first time series.

Figure 13:
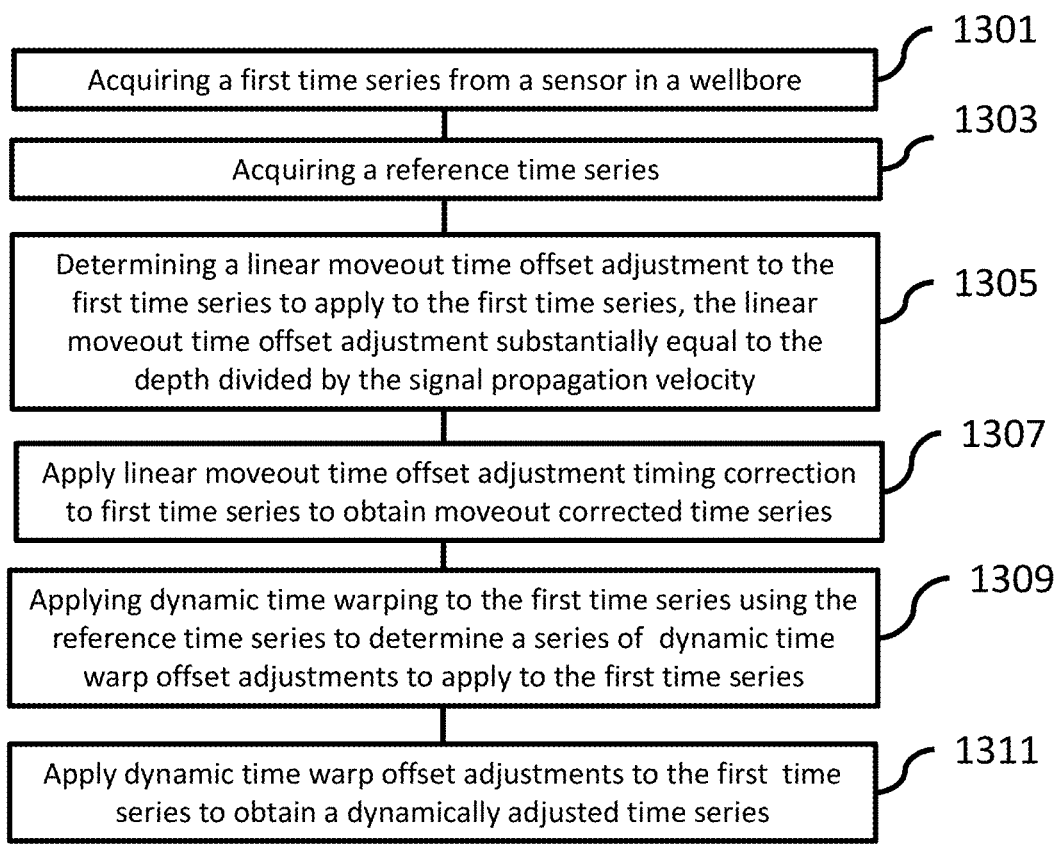
FIG. 13 illustrates a method according to further embodiments of the present disclosure for automatically adjusting time series data relative to a reference time according to various embodiments of the present disclosure.

FIG. 13 illustrates a method according to further embodiments of the present disclosure for automatically adjusting time series data relative to a reference time. A first time series is acquired from a sensor in a wellbore 1301. A reference time series is acquired, which may be acquired using a surface transducer related time series with a known relationship to a reference time 1303. A linear moveout time series offset adjustment is determined to adjust the first time series due to the downhole sensors being variable in depth. The linear moveout time offset adjustment is equal to the depth of the downhole sensor divided by signal propagation velocity or drill string 1305. The linear moveout time offset adjustment is applied to the first time series to obtain a moveout corrected time series 1307. A dynamic time warping may be applied to the first time series with respect to the reference time series to determine a series of dynamic time warp offset adjustments to apply to the first time series 1309. The series of dynamic time warp offset adjustments are then applied to the first time series to obtain a dynamically adjusted time series 1311.

Figure 14:
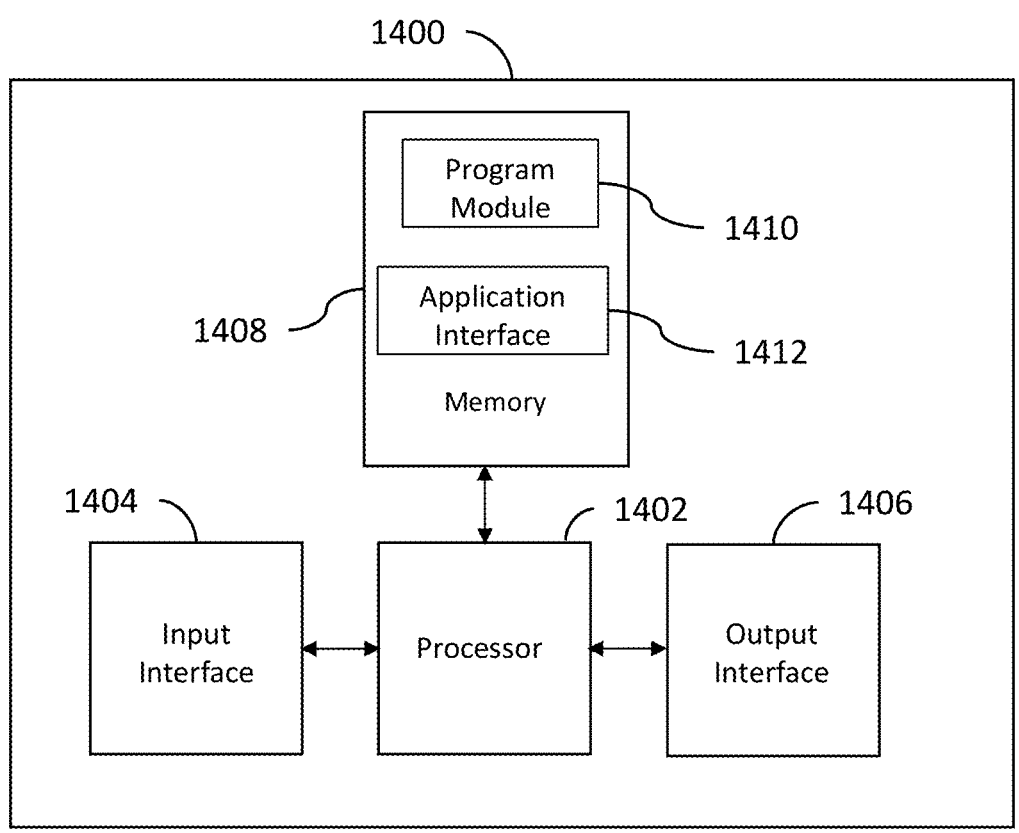
FIG. 14 illustrates a schematic diagram of an embodiment of a system that may correspond to or may be part of a computer according to various embodiments of the present disclosure.

FIG. 14 illustrates a schematic diagram of an embodiment of a system 1400 that may correspond to or may be part of a computer and/or any other computing device, such as a workstation, server, mainframe, super computer, processing graph and/or database. The system 1400 includes a processor 1402, which may be also be referenced as a central processor unit (CPU). The processor 1402 may communicate and/or provide instructions to other components within the system 1400, such as the input interface 1404, output interface 1406, and/or memory 1408. In one embodiment, the processor 1402 may include one or more multi-core processors and/or memory (e.g., cache memory) that function as buffers and/or storage for data. In alternative embodiments, processor 1402 may be part of one or more other processing components, such as application specific integrated circuits (ASICs), field-programmable gate arrays (FPGAs), and/or digital signal processors (DSPs). Although FIG. 14 illustrates that processor 1402 may be a single processor, it will be understood that processor 802 is not so limited and instead may represent a plurality of processors including massively parallel implementations and processing graphs comprising mathematical operators connected by data streams distributed across multiple platforms, including cloud-based resources. The processor 1402 may be configured to implement any of the methods described herein.

FIG. 14 illustrates that memory 1408 may be operatively coupled to processor 1402. Memory 1408 may be a non-transitory medium configured to store various types of data. For example, memory 1408 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 14, the memory 1408 may be used to house the instructions for carrying out various embodiments described herein. In an embodiment, the memory 1408 may comprise a computer program module 1410, which may embody a computer program product, which may be accessed and implemented by processor 1402. Alternatively, application interface 1412 may be stored and accessed within memory by processor 1402. Specifically, the program module or application interface may perform signal processing and/or conditioning and applying analytics to the time series data as described herein.

Programming and/or loading executable instructions onto memory 1408 and processor 1402 in order to transform the system 1400 into a particular machine or apparatus that operates on time series data is well known in the art. Implementing instructions, real-time monitoring, and other functions by loading executable software into a computer can be converted to a hardware implementation by well-known design rules. For example, decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or application specific hardware that hardwires the instructions of the software. In the same manner as a machine controlled by a new ASIC is a particular machine or apparatus, likewise a computer that has been programmed and/or loaded with executable instructions may be viewed as a particular machine or apparatus.

In addition, FIG. 14 illustrates that the processor 1402 may be operatively coupled to an input interface 1404 configured to obtain the time series data and output interface 1406 configured to output and/or display the results or pass the results to other processing. The input interface 1404 may be configured to obtain the time series data via sensors, cables, connectors, and/or communication protocols. In one embodiment, the input interface 1404 may be a network interface that comprises a plurality of ports configured to receive and/or transmit time series data via a network. In particular, the network may transmit the acquired time series data via wired links, wireless link, and/or logical links. Other examples of the input interface 1404 may be universal serial bus (USB) interfaces, CD-ROMs, DVD-ROMs. The output interface 1406 may include, but is not limited to one or more connections for a graphic display (e.g., monitors) and/or a printing device that produces hard-copies of the generated results.

Figure 15:
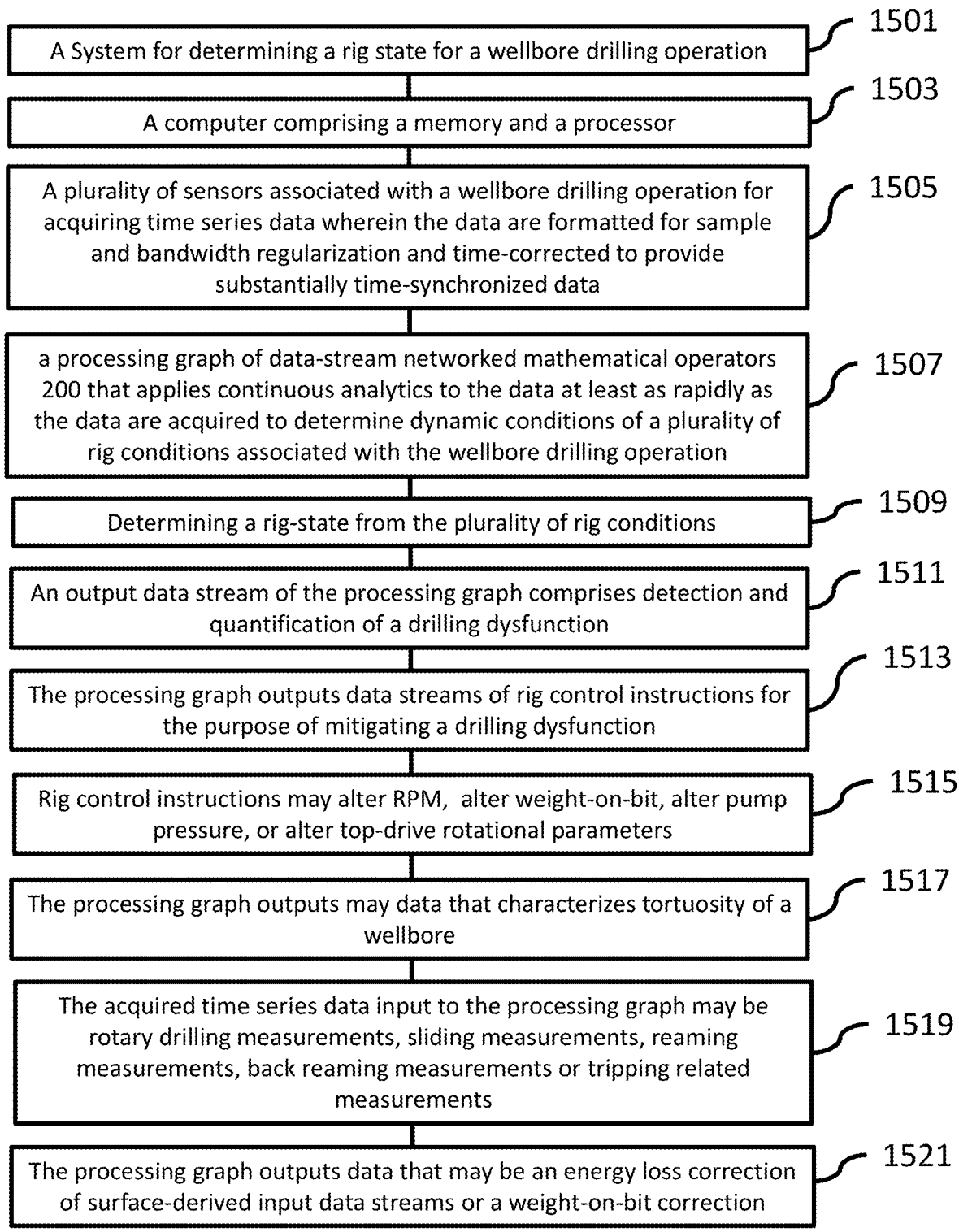
FIG. 15 illustrates a system for determining a rig-state of a drilling rig during a wellbore drilling operation according to various embodiments of the present disclosure.

As illustrated in FIG. 15, nonlimiting embodiments according to the present disclosure provide a system for determining a rig-state of a drilling rig during a wellbore drilling operation 1501, which comprises a computer (1400) comprising a memory (1408) and a processor (1402) 1503, a plurality of sensors (103, 110) associated with a wellbore drilling operation 102, 104 for acquiring time series data wherein the data are formatted for sample and bandwidth regularization and time-corrected to provide substantially time-synchronized data 1505, a processing graph of data-stream networked mathematical operators (FIG. 2) that applies continuous analytics to the data at least as rapidly as the data are acquired to determine dynamic conditions of a plurality of rig conditions associated with the wellbore drilling operation 1507 and determining a rig-state from the plurality of rig conditions 1509.

Other aspects of the system may comprise an output data stream of the processing graph that detects and quantifies a drilling dysfunction 1511. The processing graph further may output data streams of rig control instructions for the purpose of mitigating a drilling dysfunction 1513. The rig control instructions may be altering RPM, altering weight-on-bit, altering pump pressure, or altering top-drive rotational parameters 1515. The processing may also output a characterization of tortuosity of a wellbore 1517. The acquired time series data input to the processing graph may be rotary drilling measurements, sliding measurements, reaming measurements, back reaming measurements, or tripping related measurements 1519. Processing graph output may be an energy loss correction of surface-derived measurements or a weight-on-bit correction 1521.

Figure 16:
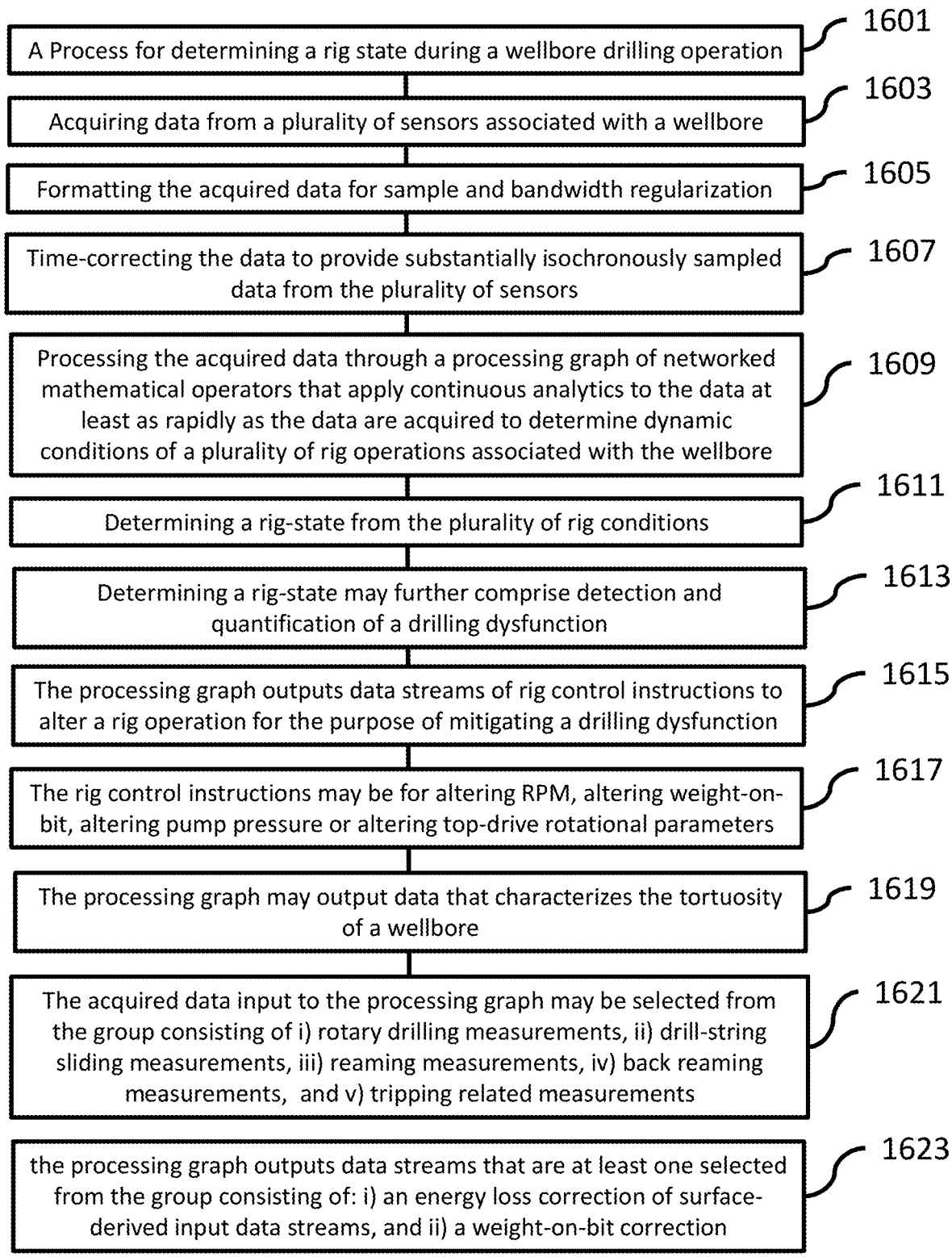
FIG. 16 illustrates a process for determining a rig-state of a drill rig during a wellbore drilling operation according to various embodiments of the present disclosure.

In other nonlimiting embodiments, some of which are illustrated in FIG. 16, a process for determining a rig-state of a drill rig during a wellbore drilling operation 1601 comprises acquiring data from a plurality of sensors associated with a wellbore 1603, formatting the acquired data for sample and bandwidth regularization 1605, time-correcting the data to provide substantially isochronously sampled data from the plurality of sensors 1607, processing the acquired data through a processing graph of networked mathematical operators that apply continuous analytics to the data at least as rapidly as the data are acquired to determine dynamic conditions of a plurality of rig operations associated with the wellbore 1609 and determining a rig-state from the plurality of rig operations conditions 1611.

In other aspects determining a rig-state further comprises detection and quantification of a drilling dysfunction 1613. The processing graph may output data streams of rig control instructions to alter rig operations to mitigate a drilling dysfunction 1615. The rig control instructions may be altering RPM, altering WOB, altering pump pressure or altering top-drive rotational parameters 1617. The output of the processing graph may be a characterization of tortuosity of a wellbore 1619. The acquired data input to the processing graph may be rotary drilling measurements, drill-string sliding measurements, reaming measurements, back reaming measurements, or tripping related measurements 1621. Other output data streams from the processing graph may be an energy loss correction of surface-derived input data streams or a weight-on-bit correction 1623.

In still further nonlimiting embodiments a drilling rig apparatus for mitigating drilling dysfunctions comprises a drill rig associated with a plurality of sensors providing time series data to a surface-based aggregator wherein the data are formatted for sample and bandwidth regularization and time-corrected to provide substantially time-synchronized data, a computer comprising a memory and a processor, a processing graph of data-stream networked mathematical operators that applies continuous analytics at least as rapidly as the time-series are acquired to determine dynamic conditions of a plurality of rig conditions associated with wellbore drilling operation and detecting a drilling dysfunction from the plurality of rig conditions.

In other nonlimiting aspect of the apparatus the processing graph outputs data streams of rig control instructions for the purpose of mitigating the detected drilling dysfunction. The rig control instructions may be for altering RPM, altering weight on bit, altering pump pressure or altering top-drive rotational parameters. An output data stream of the processing graph may quantify a drilling dysfunction.

In yet more nonlimiting embodiments a computer program product is embodied in non-transitory computer readable media, the computer program product adapted to execute a process to mitigate a drilling dysfunction during a wellbore drilling operation, which comprises acquiring data from a plurality of sensors associated with a wellbore drilling operation, formatting the acquired data for sample and bandwidth regularization, time-correcting the data to provide substantially synchronously sampled data from the plurality of sensors, processing the acquired data through a processing graph of networked mathematical operators that apply continuous analytics to the data at least as rapidly as the data are acquired to determine dynamic conditions of a plurality of rig operations associated with the wellbore, detecting a drilling dysfunction from the plurality of rig operations conditions, and outputting drill rig control instructions to mitigate the detected drilling dysfunction.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A system for rig-state determination for a drilling rig during a wellbore drilling operation, the system comprising:
    a plurality of surface sensors associated with the wellbore drilling operation and acquiring time series data, time-synchronized data being generated from the time series data; and
    a processing graph of data-stream networked mathematical operators that applies continuous analytics to the time-synchronized data generated from the time series data acquired by the plurality of surface sensors to determine downhole dynamic conditions of a plurality of rig conditions associated with the wellbore drilling operation.

2. The system of claim 1 wherein an output data stream of the processing graph comprises detection and quantification of a drilling dysfunction.

3. The system of claim 1 wherein the processing graph outputs data streams of rig control instructions for the purpose of mitigating a drilling dysfunction.

4. The system of claim 3 wherein the rig control instructions include one or more of: altering RPM, altering weight-on-bit, altering pump pressure, and altering top-drive rotational parameters.

5. The system of claim 1 wherein the processing graph outputs a data stream that characterizes tortuosity of a wellbore.

6. The system of claim 1 wherein the time series data includes one or more of rotary drilling measurements, sliding measurements, reaming measurements, back reaming measurements, and tripping related measurements.

7. The system of claim 1 wherein the processing graph outputs data streams including one or more of: an energy loss correction of surface-derived input data streams and a weight-on-bit correction.

8. A process for determining a rig-state of a drill rig during a wellbore drilling operation, the process comprising:
    acquiring surface data from a plurality of surface sensors associated with a wellbore;
    processing time-synchronized data generated from the surface data acquired from the plurality of surface sensors through a processing graph of networked mathematical operators that apply continuous analytics to the time-synchronized data to determine dynamic conditions of a plurality of rig operations associated with the wellbore; and
    determining the rig-state from the plurality of rig operations conditions.

9. The process of claim 8 wherein determining the rig-state further comprises detection and quantification of a drilling dysfunction.

10. The process of claim 8 wherein the processing graph outputs data streams of rig control instructions to alter a rig operation for the purpose of mitigating a drilling dysfunction.

11. The process of claim 10 wherein the rig control instructions including one or more of altering RPM, altering weight-on-bit, altering pump pressure, and altering top-drive rotational parameters.

12. The process of claim 8 wherein the processing graph outputs a data stream that characterizes the tortuosity of a wellbore.

13. The process of claim 8 wherein the time-synchronized data includes one or more of rotary drilling measurements, drill-string sliding measurements, reaming measurements, back reaming measurements, and tripping related measurements.

14. The process of claim 8 wherein the processing graph outputs data streams including one or more of: an energy loss correction of surface-derived input data streams and a weight-on-bit correction.

15. A drilling rig apparatus for drilling dysfunctions mitigation, the apparatus comprising:
   a drill rig associated with a plurality of surface sensors providing time series data to a surface-based aggregator, time-synchronized data being provided from the time series data to determine downhole dynamic conditions of a plurality of rig conditions associated with a wellbore drilling operation using a processing graph of data-stream networked mathematical operators that applies continuous analytics, a drilling dysfunction of the drill rig being detectable from the plurality of rig conditions.

16. The apparatus of claim 15 wherein the processing graph outputs data streams of rig control instructions for the purpose of mitigating the drilling dysfunction.

17. The apparatus of claim 16 wherein the rig control instructions include one or more of altering RPM, altering weight on bit, altering pump pressure, and altering top-drive rotational parameters.

18. The apparatus of claim 15 wherein an output data stream of the processing graph comprises quantification of drilling dysfunction.

19. The apparatus of claim 15 wherein the processing graph outputs data streams of rig control instructions for the purpose of mitigating the drilling dysfunction.

20. A computer program product embodied in non-transitory computer readable media, the computer program product adapted to execute a process for drilling dysfunction mitigation during a wellbore drilling operation, the process comprising:
   acquiring data from a plurality of surface sensors associated with the wellbore drilling operation; and
   processing the data through a processing graph of networked mathematical operators that apply continuous analytics to the data to determine downhole dynamic conditions of a plurality of rig operations associated with the wellbore drilling operation.

\* \* \* \* \*